US009384878B2

(12) United States Patent
Rowe

(10) Patent No.: US 9,384,878 B2
(45) **Date of Patent: *Jul. 5, 2016**

(54) FERROMAGNETIC CARBON AND BORON LITHIUM BOROHYDRIDE COMPLEXES

(71) Applicant: Toyota Motor Engineering & Manufacturing North America, Inc., Erlanger, KY (US)

(72) Inventor: Michael Paul Rowe, Pinckney, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,373

(22) Filed: Oct. 3, 2014

(65) Prior Publication Data

US 2015/0097649 A1 Apr. 9, 2015

Related U.S. Application Data

(63) Continuation-in-part of application No. 14/046,081, filed on Oct. 4, 2013, now Pat. No. 8,980,219, and a continuation-in-part of application No. 14/269,895, filed on May 5, 2014, and a continuation-in-part of application No. 14/269,909, filed on May 5, 2014.

(51) Int. Cl.
*C01B 6/04* (2006.01)
*H01F 3/00* (2006.01)
(Continued)

(52) U.S. Cl.
CPC .. *H01F 3/00* (2013.01); *C01B 6/21* (2013.01); *H01F 1/0311* (2013.01)

(58) Field of Classification Search
CPC ............. C01B 6/21; C01B 6/06; C01B 6/02; C01B 6/006; H01F 3/00; H01F 1/0311
See application file for complete search history.

(56) References Cited

U.S. PATENT DOCUMENTS

| | | | |
|---|---|---|---|
| 7,041,350 | B1 | 5/2006 | Rule et al. |
| 2005/0217427 | A1 | 10/2005 | Suthersan et al. |
| 2009/0264277 | A1 | 10/2009 | Raj et al. |

FOREIGN PATENT DOCUMENTS

| | | | | |
|---|---|---|---|---|
| JP | 201112202 | | 6/2011 | |
| WO | 2012007830 | A1 | 1/2012 | |
| WO | WO 2012007830 | A1 * | 1/2012 | ............ C01B 3/0042 |

OTHER PUBLICATIONS

Chen et al., "Improved Dehydrogenation Properties of Ca(BH4)2•nNH3 (n = 1, 2, and 4) Combined with Mg(BH4)2,", Sep. 2012, J. Phys. Chem., 116, 21162-21168.

(Continued)

*Primary Examiner* — Stanley Silverman
*Assistant Examiner* — Syed Iqbal
(74) *Attorney, Agent, or Firm* — Christopher G. Darrow; Darrow Mustafa PC

(57) ABSTRACT

A novel ferromagnetic composition is provided. The reagent includes at least one zero-valent atom, whether metal, metalloid, or non-metal, in complex with at least one hydride molecule. The composition need not contain any inherently ferromagnetic elements and can be much lighter than conventional iron or other metal-based ferromagnetic materials. Core-solenoid devices having ferromagnetic cores which employ the novel ferromagnetic composition are additionally provided. Examples such as electric motors or generators for use in hybrid or all-electric automobiles are included.

20 Claims, 2 Drawing Sheets

(51) Int. Cl.
*H01F 1/03* (2006.01)
*C01B 6/21* (2006.01)

(56) References Cited

OTHER PUBLICATIONS

Imamura et al., "Dehydriding of Sn/MgH2 nanocomposite formed by ball milling of MgH2 with Sn", Jul. 2007, Int. J. Hydrogen Energy, 32, 4191-4194.

Schütch et al, "Light metal hydrides and complex hydrides for hydrogen storage", 2004, Chem. Commun., pp. 2249-2258.

Wronski et al., "A new nanonickel catalyst for hydrogen storage in solid-state magnesium hydrides", 2011, Int. J. Hydrogen Energy,36, pp. 1159-1166.

Chen et al., "Improved Dehydrogenation Properties of Ca(BH4)2•nNH3 (n = 1, 2, and 4) Combined with Mg(BH4)2," J. Phys. Chem., 116, 21162-21168.

Imamura et al., "Dehydriding of Sn/MgH2 nanocomposite formed by ball milling of MgH2 with Sn", Int. J. Hydrogen Energy, 32, 4191-4194.

Varin et al., "The effects of ball milling and nonmetric nickel additive on the hydrogen desorption from lithium borohydride and manganese chloride (3LiBH4 + MnCl2) mixture", Int. J. Hydrogen Energy, 35 (2010) 3588-3597.

Wronski et al., "A new nanonickel catalyst for hydrogen storage in solid-state magnesium hydrides", Int. J. Hydrogen Energy,36, 1159-1166.

Rowe et al., "Stable Complexes of Non-Metal Elements and Hydride As Novel Reagents". U.S. Appl. No. 14/046,081, filed Oct. 4, 2014.

Rowe, "Stable Complexes of Zero-Valent Metallic Element and Hydride As Novel Reagents". U.S. Appl. No. 14/219,823, filed Mar. 19, 2014.

Rowe, "Stable Complexes of Multiple Zero-Valent Metals and Hydride As Novel Reagents". U.S. Appl. No. 14/219,815, filed Mar. 19, 2014.

Rowe, "Stable Complexes of Zero-Valent Metallic Element and Hydride As Novel Reagents". U.S. Appl. No. 14/269,895, filed May 5, 2014.

Rowe et al., "Stable Complexes of Non-Metal Elements and Hydride As Novel Reagents". U.S. Appl. No. 14/269,909, filed May 5, 2014.

* cited by examiner

FERROMAGNETIC CARBON AND BORON LITHIUM BOROHYDRIDE COMPLEXES

CROSS-REFERENCE TO RELATED APPLICATIONS

This application is a continuation-in-part of Application No. 14/046,081, filed Oct. 4, 2013, a continuation-in-part of Application No. 14/269,895, filed May 5, 2014, and a continuation-in-part of Application No. 14/269,909, filed May 5, 2014, each of which is herein incorporated by reference in its entirety.

TECHNICAL FIELD

The present invention relates in general to a ferromagnetic composition of matter composed of a zero-valent element in stable complex with one or more hydride molecules and to core-solenoid devices that include the ferromagnetic composition in their core.

BACKGROUND

Ferromagnetic materials, materials with a strong tendency to align atomic magnetic dipoles with strict parallelism, are indispensable to the operation of a wide array of retail and industrial devices. Such materials are strongly responsive to applied magnetic fields and can also be prepared to emanate stable, bulk magnetic fields themselves. As examples of applications, a wide array of electronic devices such as medical and scientific diagnostic devices, electronic data storage media, and electronic or electromagnetic beam-steering devices rely on ferromagnetic materials to function. Of particular interest are core-solenoid devices having ferromagnetic cores, such as electric motors and electric generators.

Conventionally, ferromagnetic materials are alloys or compositions consisting primarily of the inherently ferromagnetic elements such as iron, nickel, cobalt, as well as certain compositions of rare-earth metals. Because of the relatively high density of these elements, typically about 8 $g/cm^3$ or 500 $lb/ft^3$, devices which employ an appreciable amount of ferromagnetic material tend to be very heavy.

Automotive vehicles use ferromagnetic materials in a variety of ways, particularly in core-solenoid devices. These range from the relatively small, such as an alternator or an electric motor that operates a power window, to the relatively large, such as in the drive train of a hybrid vehicle or all-electric vehicle. The development of ferromagnetic (including ferrimagnetic) materials or compositions having much lower density than that of the inherently ferromagnetic elements can potentially decrease the weight and thereby improve the efficiency of such vehicles.

SUMMARY

Ferromagnetic compositions and core-solenoid devices having such ferromagnetic compositions, and automotive vehicles having such core-solenoid devices are provided.

In one aspect, a composition is disclosed. The composition comprises a complex according to Formula I:

$$Q^0.X_y \quad \text{I,}$$

wherein $Q^0$ is a zero-valent element, X is a hydride, and y is an integral or fractional value greater than zero. In some variations, the zero-valent element is a non-metal or a metalloid, and in all instances the complex is ferromagnetic. In two particular examples the zero-valent element is carbon or boron. In some instances, the hydride can be lithium borohydride, and y can be one or two.

In another aspect, a core-solenoid device is disclosed. The core-solenoid device includes a conductive solenoid coiled around a core. The core includes a composition comprising a complex according to Formula I:

$$Q^0.X_y \quad \text{I,}$$

wherein $Q^0$ is a zero-valent element, X is a hydride, and y is an integral or fractional value greater than zero. In some variations, the zero-valent element is a non-metal or a metalloid. In two particular examples the zero-valent element is carbon or boron.

In another aspect an automobile is provided. The automobile includes a core-solenoid device. The core-solenoid device includes a conductive solenoid coiled around a core. The core includes a composition comprising a complex according to Formula I:

$$Q^0.X_y \quad \text{I,}$$

wherein $Q^0$ is a zero-valent element, X is a hydride, and y is an integral or fractional value greater than zero. In some variations, the zero-valent element is a non-metal or a metalloid. In two particular examples the zero-valent element is carbon or boron. In some instances, the hydride can be lithium borohydride, and y can be one or two.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
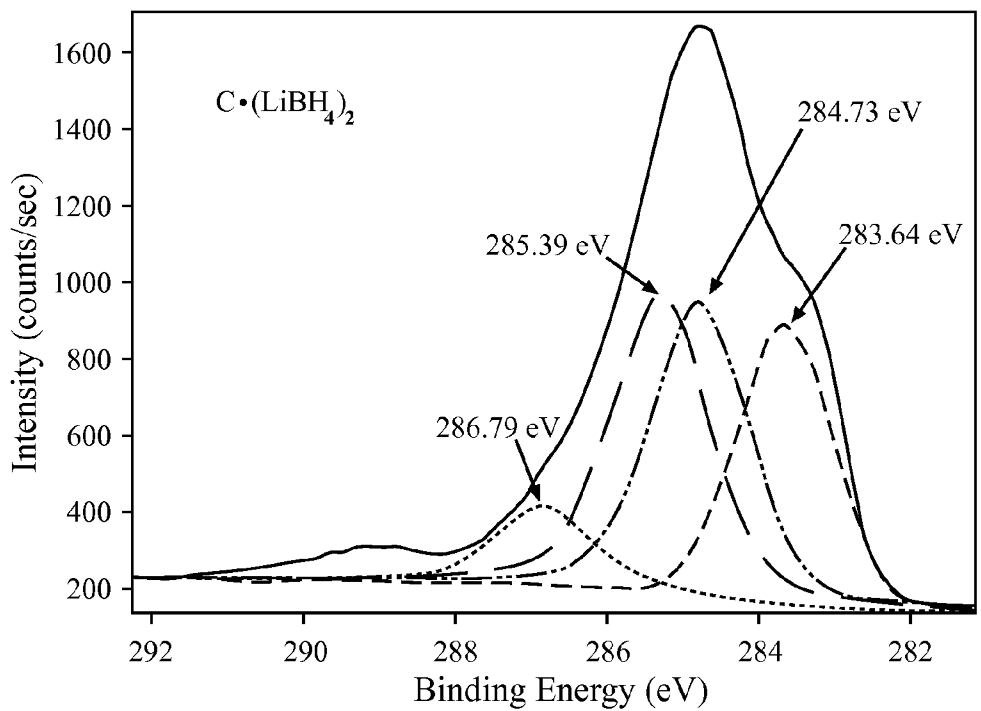
FIG. 1 is an x-ray photoelectron spectrum of a $C.(LiBH_4)_2$ complex synthesized by the disclosed method for synthesizing a complex.

The present disclosure describes novel, lightweight ferromagnetic compositions, electromechanical devices which employ the compositions, and automobiles having such electromechanical devices. The ferromagnetic compositions themselves comprise a novel complex between a zero-valent element and a hydride. These compositions can be prepared, for example, by a simple, reproducible ball-milling procedure.

Because the disclosed ferromagnetic compositions need not include any inherently ferromagnetic elements, they can be very light, for example having density perhaps one-tenth that of iron. Yet they may also in some instances possess coercivity up to or more than ten times greater than that of raw iron. For this reason, the disclosed core-solenoid devices which employ these novel ferromagnetic compositions can potentially be very light as compared to core-solenoid devices employing conventional ferromagnetic materials.

As the term will be used herein, “zero-valent” or “zero-valent element” refers to the condition of being in oxidation state zero. The term can alternatively be defined as describing the condition of being neither ionized nor covalently associated with other species. More generically, the phrase “zero-valent” as used herein refers to the condition of the material so described of being in elemental form.

As used herein, the term "element" refers to any element of the periodic table. In particular, it refers to any element which, in its zero-valent form, is a solid under the conditions of use. More particularly still, the term "element", as used herein, refers to any element which is solid under standard conditions of temperature and pressure.

The phrase "metallic element" refers to a metal, a lanthanide, or a metalloid. A "metal" can refer to an alkaline earth metal, an alkali metal, a transition metal, or a post-transition metal. The phrase "transition metal" can refer to any D-block metal of Groups 3 through 12. The phrase "post-transition metal" can refer to Group 13 through 16 metals. The term "metalloid" can refer to any of boron, silicon, germanium, arsenic, antimony, tellurium, or polonium.

As used here, the phrases "non-metallic element" and "non-metal" refer to any non-metallic element, especially any non-metallic element which is generally a solid at standard conditions of temperature and pressure. In particular, the phrases "non-metallic element" and "non-metal" refer to any of carbon, phosphorous, sulfur, and selenium.

As used here, the term "hydride" refers generally to any molecular species capable of functioning as a hydrogen anion donor. In different instances, a hydride as referenced herein can be a binary metal hydride or "salt hydride" (e.g. NaH, or $MgH_2$), a binary metalloid hydride (e.g. $BH_3$), a complex metal hydride (e.g. $LiAlH_4$), or a complex metalloid hydride (e.g. $LiBH_4$ or $Li(CH_3CH_2)_3BH$). In some examples the hydride will be $LiBH_4$. The term hydride as described above can in some variations include a corresponding deuteride or tritide.

A ferromagnetic composition is disclosed, comprising a complex according to Formula I:

$$Q^0.X_y \quad \text{I,}$$

wherein $Q^0$ is a zero-valent element, wherein X is a hydride, and wherein y is an integral or fractional value greater than zero. In some variations, the zero-valent element, $Q^0$, can be a non-metal and in other variations it can be a metallic element. In some specific instances of the latter, $Q^0$ can be a metalloid.

The value y according to Formula I defines the stoichiometry of hydride molecules to zero-valent elemental atoms in the complex. The value of y can include any integral or fractional value greater than zero. In some instances, 1:1 stoichiometry wherein y equals 1 may be useful. In other instances, a molar excess of hydride to zero-valent element, for example where y equals 2 or 4 may be preferred. A molar excess of hydride to zero-valent element can, in some instances, ensure that there is sufficient hydride present for subsequent applications.

The complexes of the present disclosure can have any supramolecular structure, or no supramolecular structure. No structural details are implied by any of Formulae I-IV. Without being bound to any particular structure, and without limitation, the complex could exist as a supramolecular cluster of many zero-valent elemental atoms interspersed with hydride molecules. The complex could exist as a cluster of zero-valent elemental atoms in which the cluster is surface-coated with hydride molecules. The complex could exist as individual zero-valent elemental atoms having little to no molecular association with one another, but each being associated with hydride molecules according to Formula I. Any of these microscopic structures, or any other consistent with Formula I, is intended to be within the scope of the present disclosure.

In some instances, the complex according to Formula I can have coercivity greater than 75 Oersted (Oe) at standard temperature (25° C. or 298.15 K). In some instances, the complex according to Formula I can have coercivity greater than 100 Oe at standard temperature.

One process by which a complex according to Formula I can be obtained is to combine the zero-valent element, $Q^0$, with the hydride X and ball-mill them together. It may prove useful for the elemental starting material to be in a high surface area form, such as a nanoparticulate or microparticulate powder. The ball-milling step can be performed with any type of ball mill, such as a planetary ball mill, and with any type of ball-milling media, such as stainless steel beads. It will typically be preferable to perform the ball-milling step in an inert environment, such as in a glove box under vacuum or under argon.

In an Example, elemental carbon powder can be combined with lithium borohydride in a 2:1 molar ratio and the combination ball-milled in an inert environment for four hours. The resulting product is the complex $C.Li(BH_4)_2$, an x-ray photoelectron spectrum of which is reproduced in FIG. 1. In another Example, elemental boron powder can be combined with lithium borohydride in a 2:1 molar ratio and the combination ball-milled in an inert environment for four hours. The resulting product is the complex $B.Li(BH_4)_2$, an x-ray photoelectron spectrum of which is reproduced in FIG. 2.

Figure 3:
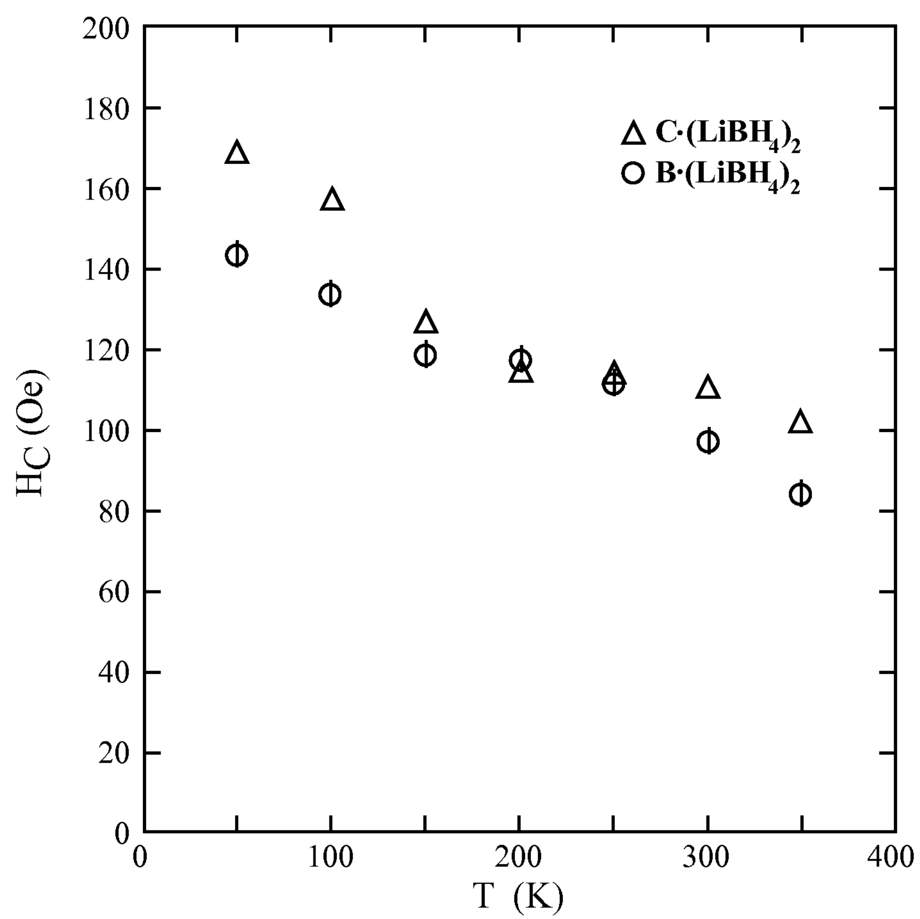
FIG. 3 is a graph of coercivity ($H_c$) as a function of temperature for the complexes of FIGS. 1 and 2.

As shown in FIG. 3, both complexes, $C.Li(BH_4)_2$ and $B.Li(BH_4)_2$, display ferromagnetism. In particular, FIG. 3 is a plot of coercivity in Oersted (Oe) as a function of temperature in kelvin (K) for the $C.Li(BH_4)_2$ complex (open triangles) and $B.Li(BH_4)_2$ complex (open circles). As can be seen, $C.Li(BH_4)_2$ has coercivity decreasing from about 170 Oe to 100 Oe with increasing temperature, while $B.Li(BH_4)_2$ has coercivity decreasing from about 140 Oe to 80 Oe with increasing temperature. As a comparison point, while $C.Li(BH_4)_2$ and $B.Li(BH_4)_2$ have coercivity of ~120 Oe and ~100 Oe, respectively, at standard temperature, raw iron is typically observed to have coercivity in the range of 2 Oe at standard temperature. Thus these novel complexes display appreciable ferromagnetism regardless of the fact that, in these examples, they contain no inherently ferromagnetic elements.

Given the densities of lithium borohydride (~0.67 g/cm$^3$) and of elemental carbon or boron (~2.2 and 2.3 g/cm$^3$, respectively), the densities of the Example complexes can be predicted to be in the vicinity of 1 g/cm$^3$. Thus, while having appreciable coercivity, compositions of the present disclosure can have density several-fold lower than that of iron (~8 g/cm$^3$) or of virtually any conventional ferromagnetic material. It is therefore noted that compositions of the present disclosure may be very useful in applications of ferromagnetic materials that would benefit from reduced weight.

Another feature of the disclosure is a core-solenoid device having a core and a solenoid conductor coiled around the core. The core comprises a ferromagnetic composition, the ferromagnetic composition being of the type described above. Examples of such a core-solenoid device include an electric motor and an electric generator. Yet more particular examples include core-solenoid devices for use in an automotive vehicle, such as an electric motor for use in the drivetrain of a hybrid or all-electric vehicle or an electrical generator that can be used to charge a vehicle battery. A variety of physical configurations of such core-solenoid devices are well known to those skilled in the art and can include such parameters as shape and orientation of the core, presence and/or size of air gaps between core and solenoid, and many other configurational details appropriate to the particular use of the device. For reasons noted above, such core-solenoid devices are expected to be lower in weight compared to similar devices having conventional ferromagnetic materials.

Thus, another feature of the disclosure is an automotive vehicle having a core-solenoid device of the type described above. As mentioned, examples of such an automotive vehicle can include a hybrid vehicle or an all-electric vehicle having an electric motor and/or an electrical generator. In such examples, the electric motor and/or electrical generator can have a conductive solenoid coiled around a core which comprises a ferromagnetic composition according to the present disclosure. As mentioned above, such core-solenoid devices are expected to be relatively light, and therefore automotive vehicles of the present disclosure are expected to have lower weight and improved efficiency in comparison to similar vehicles having core-solenoid devices with conventional ferromagnetic materials.

The present invention is further illustrated with respect to the following examples. It needs to be understood that these examples are provided to illustrate specific embodiments of the present invention and should not be construed as limiting the scope of the present invention.

EXAMPLE 1

$C.Li(BH_4)_2$ Synthesis

To a stainless steel ball mill jar (under Ar) is added 0.052 g carbon black and 0.182 g lithium borohydride. This is then mixed in a planetary ball mill at 160 rpm for 4 hours. An XPS spectrum of the resulting complex is shown in FIG. 1.

EXAMPLE 2

$B.Li(BH_4)_2$ Synthesis

Figure 2:
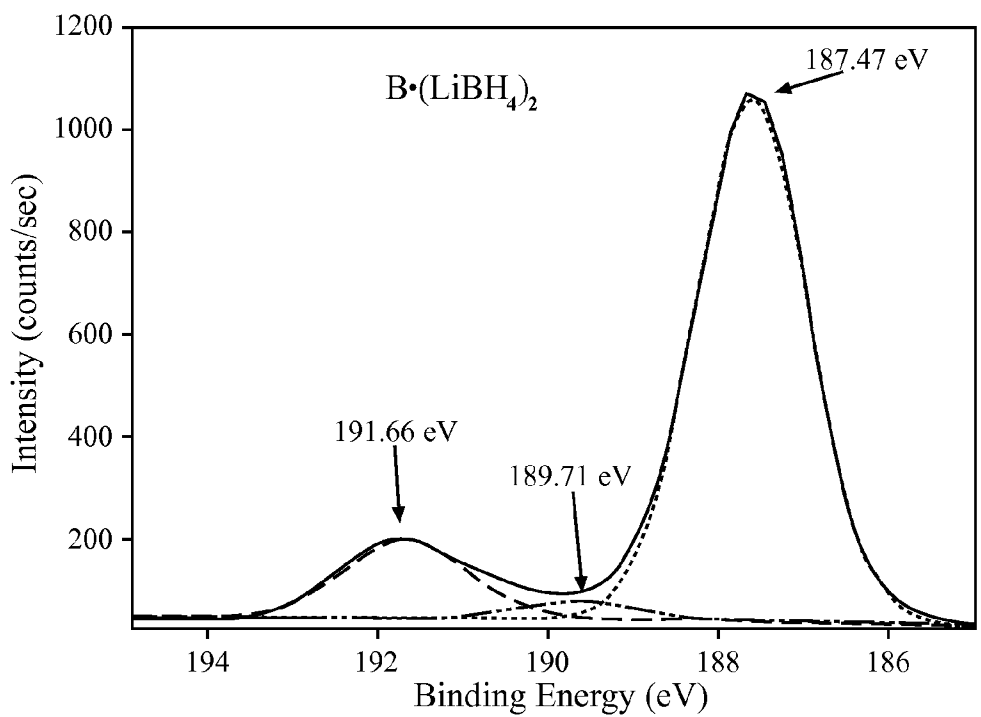
FIG. 2 is an x-ray photoelectron spectrum of a $B.(LiBH_4)_2$ complex synthesized by the disclosed method for synthesizing a complex.

To a stainless steel ball mill jar (under Ar) is added 0.052 g boron and 0.208 g lithium borohydride. This is then mixed in a planetary ball mill at 160 rpm for 4 hours. An XPS spectrum of the resulting complex is shown in FIG. 2.

EXAMPLE 3

Coercivity Measurement

M(H) curves were measured for the complexes prepared in Examples 1 and 2 at temperatures of 50, 100, 150, 200, 250, 300, and 350 K. At each temperature, coercivity of the sample was determined from the x-intercept upon demagnetization. The results are shown in FIG. 3.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A composition comprising a complex according to a formula, $$Q^0.X_y,$$

wherein $Q^0$ is a zero-valent element, X is a hydride, and y is an integral or fractional value greater than zero and wherein the complex is ferromagnetic.

2. The composition of claim 1 wherein $Q^0$ is a non-ferromagnetic element.

3. The composition of claim 1 wherein $Q^0$ is a non-metal or a metalloid.

4. The composition of claim 3 wherein $Q^0$ is carbon or boron.

5. The composition of claim 1 wherein X is lithium borohydride.

6. The composition of claim 1 wherein the complex has coercivity greater than 75 Oersted at standard temperature.

7. A core-solenoid device having;

a core; and a solenoid conductor coiled around the core, wherein the core comprises a complex according to a formula, $$Q^0.X_y,$$

and wherein $Q^0$ is a zero-valent element, X is a hydride, and y is an integral or fractional value greater than zero.

8. The core-solenoid device of claim 7 wherein $Q^0$ is a non-ferromagnetic element.

9. The core-solenoid device of claim 7 wherein $Q^0$ is a non-metal or a metalloid.

10. The core-solenoid device of claim 9 wherein $Q^0$ is carbon or boron.

11. The core-solenoid device of claim 7 wherein X is lithium borohydride.

12. The core-solenoid device of claim 7 which is an electric motor or an electric generator.

13. The core-solenoid device of claim 7 wherein the complex has coercivity greater than 75 Oersted at standard temperature.

14. An automobile having a core-solenoid device, the core-solenoid device having a conductive solenoid coiled around a core, the core comprising a complex according to a formula, $$Q^0.X_y,$$

wherein $Q^0$ is a zero-valent element, X is a hydride, and y is an integral or fractional value greater than zero and wherein the complex is ferromagnetic.

15. The automobile of claim 14 wherein $Q^0$ is a non-ferromagnetic element.

16. The automobile of claim 14 wherein $Q^0$ is a non-metal or a metalloid.

17. The automobile of claim 16 wherein $Q^0$ is carbon or boron.

18. The automobile of claim 14 wherein X is lithium borohydride.

19. The automobile of claim 14 wherein the core-solenoid device is an electric motor or an electric generator.

20. The automobile of claim 14 wherein the complex has coercivity greater than 75 Oersted at standard temperature.

* * * * *